Patented May 7, 1929.

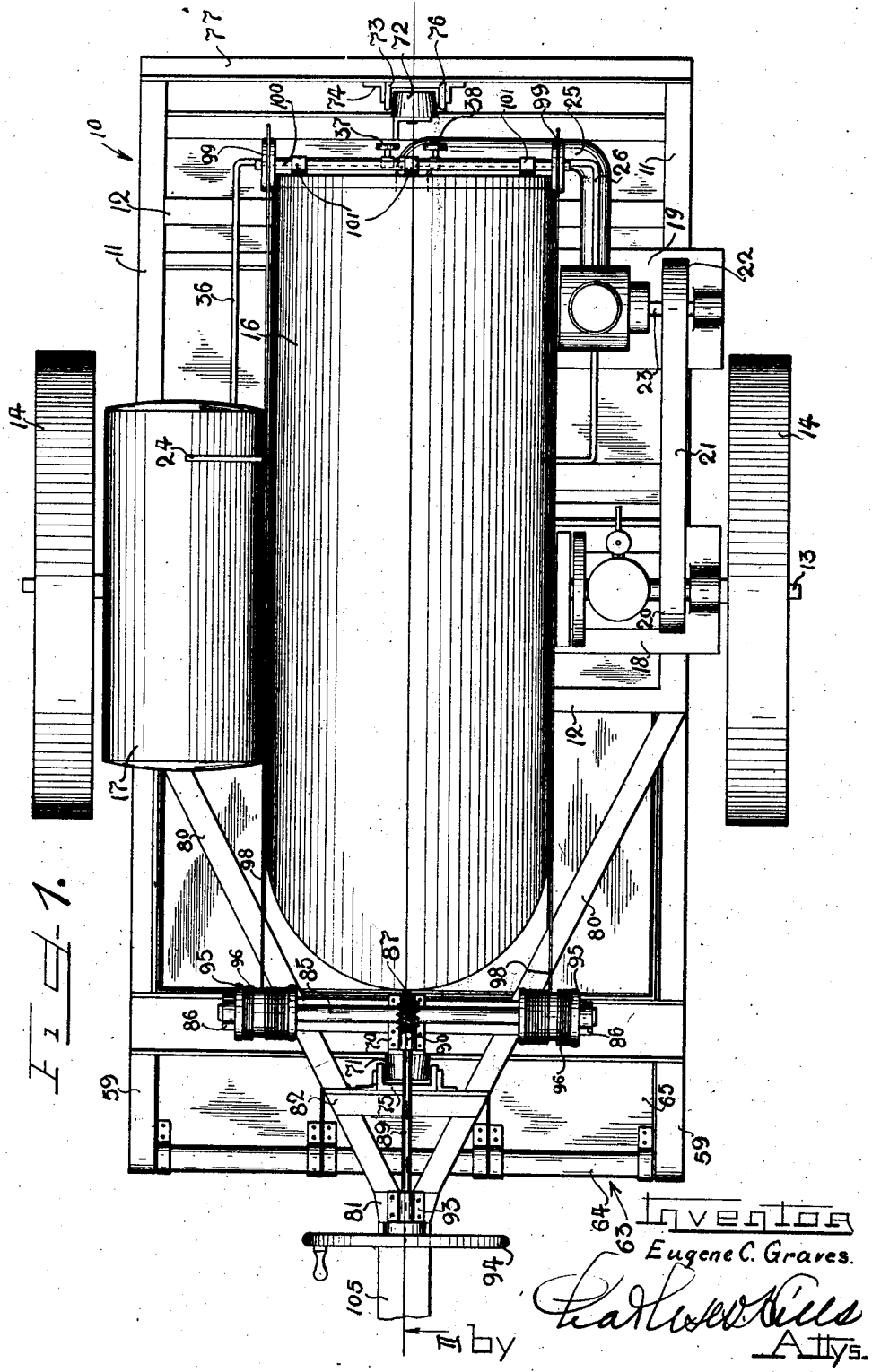

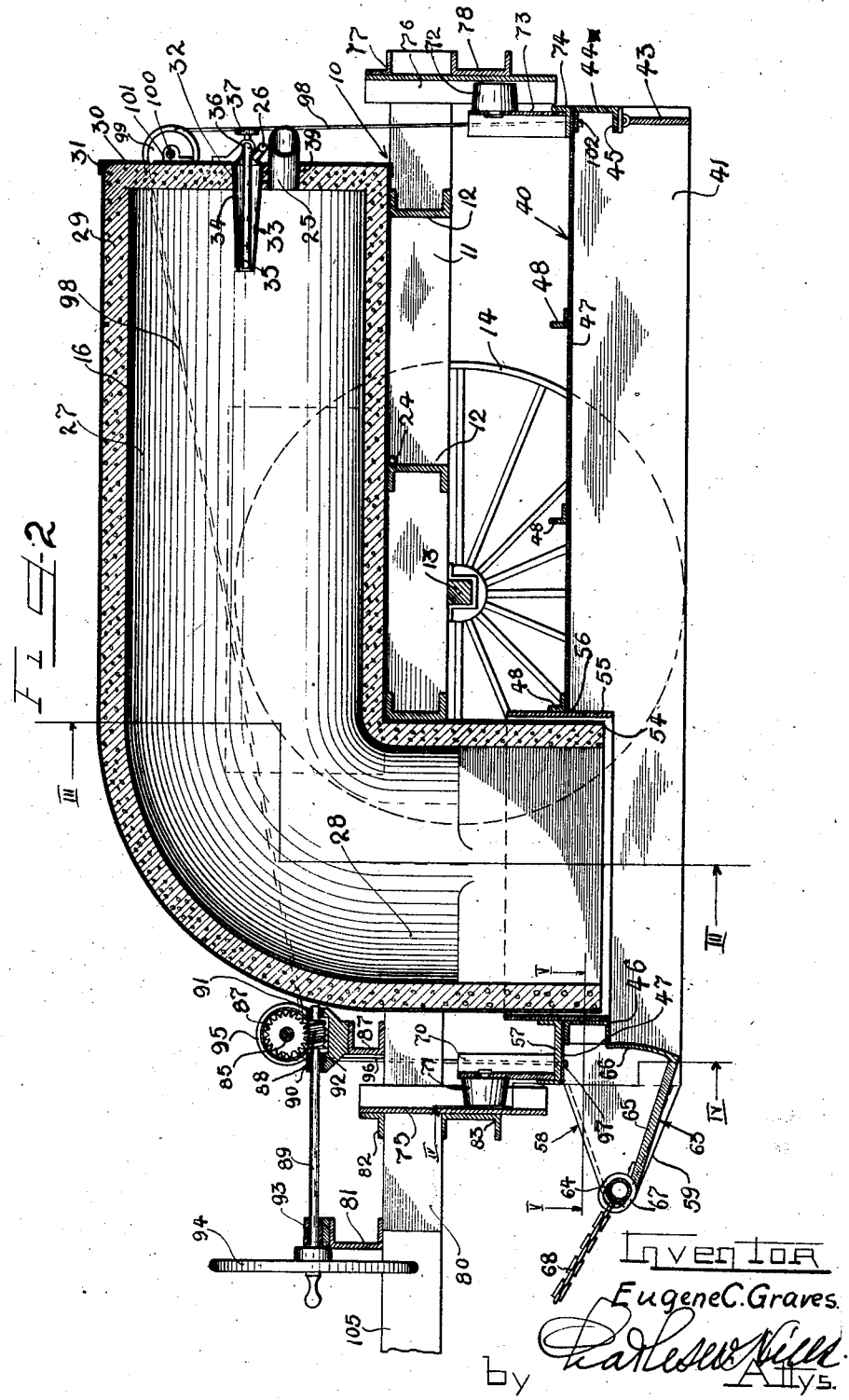

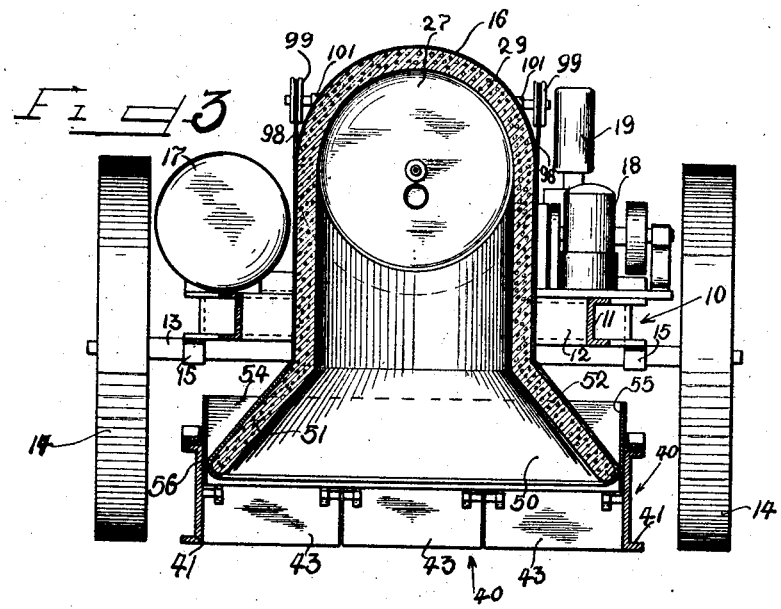
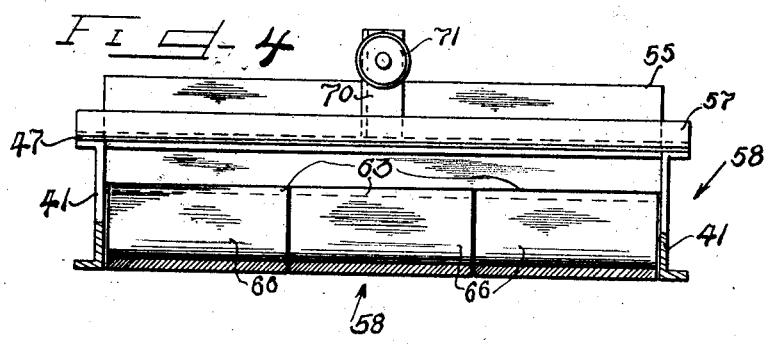
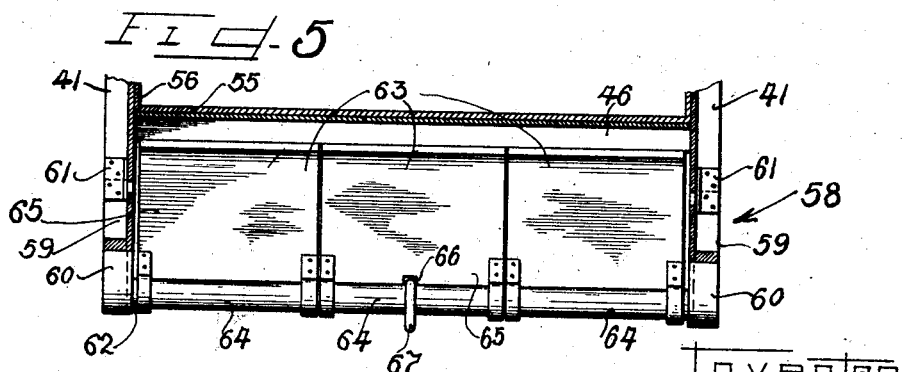

1,711,527

UNITED STATES PATENT OFFICE.

EUGENE C. GRAVES, OF CHICAGO, ILLINOIS.

WEED-BURNING APPARATUS.

Application filed September 21, 1927. Serial No. 220,863.

My invention pertains to weed burning apparatus of the same general type as that disclosed in my Patent No. 1,395,637, issued November 1, 1921.

In my earlier patent I have disclosed a weed killing implement which not only has a burner but also includes mechanism for cutting and crushing the earth preparatory to the passing of the burner thereover. This operation was essential since the burner was fixed and could not be moved over bumps or raised portions in the ground.

The object of the present invention is to provide a weed killing implement or weed burner which does not require any crushing rolls.

Another object of my invention is to provide a burner construction for killing weeds which is adjustable vertically to and from proximity to the ground.

Other objects and advantages of my invention will more fully appear from the following detailed description taken in connection with the accompanying drawings which illustrate one embodiment thereof and in which Figure 1 is a plan view of a weed burner embodying the features of the present invention;

Figure 2 is a vertical sectional view taken on the line II—II of Figure 1, looking in the direction indicated by the arrows;

Figure 3 is a vertical cross sectional view taken on the line III—III of Figure 2, looking in the direction indicated by the arrows;

Figure 4 is a sectional view taken on substantially the line IV—IV of Figure 2, looking to the right; and Figure 5 is a sectional view taken on substantially the line V—V of Figure 2, looking downwardly.

In the drawings:

The reference character 10 designates generally a platform or supporting structure for the burner mechanism of my invention. This platform is preferably made of a plurality of longitudinal channel beams 11 interconnected by transverse channel beams 12. Arranged substantially centrally of the platform 10 and disposed thereunder is an axle 13 having a square cross section. Mounted upon the ends of the axle 13 are a pair of wheels 14. These wheels are disposed adjacent the longitudinal edges of the platform 10. The platform 10 is suitably anchored to the axle 13 by means of a plurality of clips, such as those designated by the reference character 15 in Figure 3.

Mounted on top of the platform or frame 10 and extending longitudinally thereof is a combustion chamber 16. A fuel supply tank 17 is mounted on the platform on one side of the combustion chamber 16 and a gas engine 18 is mounted on the platform on the other side of the chamber 16. Positioned adjacent the engine 18 and disposed on the top of the platform 10 is a compressor unit 19 which is operatively connected to the gas engine. The engine 18 includes a power driven pulley 20 embraced by a frictional belt 21 connected to the driving pulley 22 of the compressor unit 19 in a manner well-known to those skilled in this art. The pulley 22 is mounted upon the driving shaft 23 of the compressor unit. Since the compressor unit may be of any conventional construction and inasmuch as it does not per se constitute a part of the present invention no further description of the same will be given.

The compressor unit 19 is connected to the top of the fuel tank 17 by means of a pressure pipe line 24. This line extends under the chamber 16 and is disposed transversely of the platform 10. The function of this pressure line 24 is to place the liquid fuel in the tank 17 under a pressure greater than that of the atmosphere. The unit 19 also has a main pressure line 25 disposed in communication with the interior of the combustion chamber 16 and an auxiliary pressure line 26, which, as will be apparent with the progress of the present description, is utilized to atomize the fuel sprayed into the combustion chamber 16.

As best shown in Figure 2, it will be readily evident that the combustion chamber 16 comprises a tubular construction having a right angle shape. In other words, the chamber 16 resembles a right angle elbow. It consists essentially of a horizontal leg 27 and a vertical leg 28. The horizontal leg 27 is disposed on top of the platform 10 whereas the vertical leg 28 extends downwardly through a space separating certain of the transverse channels 12. The chamber 16 as a whole may be made of iron and is preferably lined with a refractory material, such as fire brick, designated by the reference character 29. The end of the horizontal leg 27, as shown in Figure 2, is provided with a closure plate 30 suitably anchored thereto. This plate 30 includes a peripheral flange 31 which embraces the peripheral edge of the combustion chamber proper. It will be noted that even the plate 30 is provided with a refractory lining of the same material as lining 29. The plate 30 as well as its refractory lining 31 is provided with a substantially central opening 32 which is disposed concentric with the leg 27 of the chamber 16. Disposed in this opening 32 is an atomizer burner 33 arranged to discharge towards the front end of the machine and thereby direct the heat towards the front end of the oven where it is needed. This burner 33 comprises an outer member or casing 34 to which is connected the auxiliary air line 26. Telescoping this member 34 is an oil tube 35 connected to the oil or fuel line 36 coming from the bottom of the tank 17. A manually controllable valve 37 is disposed in the fuel line 36 for controlling the flow of oil therethrough. Similarly, the air line 26 is provided with a hand valve 38 by means of which the supply of air to the burner 33 may be varied. It will be noted that the closure plate 30 is provided with an additional opening 39 disposed below the opening 32. Extending into this opening 39 is an end of the air line 25. This air line 25 in reality constitutes a blower for blowing the products of combustion developed in the combustion chamber 16 down through the vertical leg 28 of the chamber. Of course, it is to be understood that although I have illustrated a simple burner and burner construction in order to facilitate the description of a single embodiment of my invention any other type of conventional burner or blower construction may be used in place thereof without deviating from the features of this invention.

The lower end of the combustion chamber 16, or in other words, the vertical leg 28, extends into the top of an oven-like construction which extends the length of the platform 10 and is substantially as wide as the platform 10. This oven construction is designated generally by reference character 40. As shown in Figure 3, it includes a pair of spaced longitudinal channels 41—41. At one end of the oven 40 these channels are connected by a plurality of pivotally mounted swingable end members 43. Each of these members 43 is pivotally attached to a transverse channel beam 44 rigidly secured to longitudinal channels 41 and 41. It will be observed that the end members 43 are disposed directly below the flange 45 of transverse channel 44 (Figure 2). Each of these members 43 is adapted to swing independently of the others. In the forward movement of the burner should one of the members 43 strike a stone or some other obstruction on the ground, it will pivot or swing outwardly to permit of the oven 40 passing over the stone. Obviously, by providing a sectionalized end comprising the three members 43, it is possible to minimize the size of opening produced in the end of the oven due to the obstruction as it leaves the oven. This is desirable for the reason that it minimizes the loss of heat incidental to the opening produced in the rear end of the oven. That is to say, if the end comprised a single swingable member the opening produced in the oven by it swinging outwardly would be much greater than is the case with the construction shown. It will, therefore, be evident that the loss of heat in such a construction would be greater than that in the oven shown.

At the forward end of the oven 40 the two longitudinal members 41 are interconnected by a transverse channel beam 46 disposed parallel to the beam 44. Mounted on top of the beams 41—41 and the beam 44 is a top comprising a metallic plate 47. This plate may be reinforced by transverse angle arms 48 secured to it on its top surface, as shown in Figure 2. The top plate 47 extends the entire length of the oven 40 and includes an opening 56 for receiving the lower end of the leg 28 of the combustion chamber. As best shown in Figure 3, two of the sides of the lower end of the leg 28 are flared outwardly so as to provide a relatively great orifice 50 at the lower end of the combustion chamber 16. I designate the two flared sides by the reference characters 51 and 52. This flared end of the combustion chamber fits in a pocket 54 defined by a vertical sheet metal member 55 shaped to conform with the periphery of the lower end of the leg 28. This member 55 fits in the opening 56 in the top plate 47. Furthermore, member 55 may be anchored to the top plate 40 by any suitable means.

The forward end of the oven 40 is adapted to be normally closed by a pivotally mounted closure member designated generally by the reference character 58 and illustrated in detail in Figures 4 and 5. It will be noted that the longitudinal channels 41—41 defining the oven 40 extend a slight ways beyond the transverse channel beam 46 (Figure 5). The closure member 58 extends into the space defined on the external side of beam 46 by longitudinal beams 41. Disposed on top of the channel 46 and on top of the flanges of beams 41—41 is a relatively large transverse channel 57. The flanges of this channel 57 extend upwardly as shown in Figure 2. Also, if it is so desired, the tubular member 55 may be suitably anchored to channels 57 and 46.

The closure 58 comprises essentially a pair of spaced angular end castings 59—59 anchored to the flanges of the longitudinal channels 41 by means of fastening plates 61 (Figure 5). Each of the castings 59 includes a bearing portion 60 in which an end of the pivot rod 62 is anchored. This pivot rod is disposed between and connects the two castings 59—59. Pivotally mounted on this rod 62 are a plurality of closure sections 63 each of which includes a sleeve portion 64 and an integral plate portion 65. The plate portion 65 has formed integral therewith an upturned vertical lip 66. This lip, as shown in Figure 2, is adapted to bridge the space between the ground and the lower flange of the transverse channel 46. Obviously, each sleeve 64 of each section 63 is loosely mounted on the pivot rod 62 whereby the section 63 is free to move vertically should an obstruction strike it in the forward movement of the burner, thus permitting the obstruction to enter the oven without the necessity of raising the oven. The principal advantage of this sectionalized construction is the same as that of the other sectionalized end, namely, that it minimizes heat losses.

The central section 63 has its plate provided with a slot through which passes a portion of an iron ring 67. This ring 67 encircles the intermediate sleeve 64 and is adapted to have fastened thereto a chain 68 (Figure 2) which may be coupled to a tractor or other vehicle used to pull the burner over the ground. That is to say, the oven 40 is preferably moved forward by a direct pull on the chain 68 rather than a pull on the frame 10. In other words, although the frame 10 and the oven 40 are both moved forward by a common force they are preferably connected independently to this force and are thus not dependent upon each other for their forward movement. This means that the lower end of the combustion chamber 27 will not be frictionally engaged by the tubular member 55 in the forward movement of the vehicle inasmuch as the forward movement is not imparted to the oven through the end of the combustion chamber.

I shall now proceed to describe in detail the novel mechanism which I employ for raising and lowering the oven 40. Fastened to the transverse channel 57 is a vertical channel 70 to which is rotatably attached a guide roller 71. This roller as shown in Figure 4 is preferably disposed in a central position with respect to channel 57. Positioned at the other end of the oven 40 is a second roller 72 which is rotatably carried by a vertical channel member 73 fastened to a transverse channel 74 secured to the top 47 of oven 40. The guide roller 72, as shown in Figure 1, is disposed in alignment with the roller 71. It will thus be evident that the two guide rollers 71 and 72 are carried by the oven 40.

The roller 71 is adapted to roll on the flanges of a vertical channel beam 75 and the roller 72 is adapted to roll on the flanges of a vertical channel beam section 76. The channel 76 is suitably fastened to a transverse angle arm 77 and a transverse channel beam 78. The angle arm 77 is anchored to the top flanges of the longitudinal beams 11 of frame 10. The channel beam 78 is anchored to the lower flanges of these two beams.

Referring to Figures 1 and 2, it will be noted that the longitudinal beams 11—11 of frame 10 extend only to the first transverse beam 12. Extending from the forward ends of the two beams 11—11 and converging toward each other are a pair of diagonal beams 80—80. These beams are connected at their forward ends by means of a channel 81. Also, they may be fastened by any suitable means such, for example, as bolts or rivets, to the ends of beams 11—11 of main frame 10. Positioned on top of the flanges of beams 80—80 is a transverse angle arm 82 to which is fastened the vertical guide beam 75. This beam extends downwardly between the converging beams 80—80 and is secured to the lower flanges of these beams by means of a transverse channel beam 83 (Figure 2).

Positioned at one end of the combustion chamber 16 is a transverse shaft 85 which is journaled at its ends in bearings 86 carried by a transverse channel member 87 anchored to the top flanges of converging beams 80—80. Secured to an intermediate portion of this shaft 85 is a worm wheel 87 which meshes with a worm 88 secured to an end of longitudinal shaft 89. The portions of the shaft 89 adjacent worm 88 are journaled in bearings 90 and 91 (Figure 2) carried by a block 92 fastened to the channel beam 87. The other end of shaft 89 is journaled in a bearing 93 fastened to the top flange of channel beam 81. Also secured to this end of shaft 89 is a hand wheel 94 by means of which the shaft may be manually rotated.

Secured to the end of shaft 85 adjacent the bearings 86 are a pair of drums 95. Each drum 95 has wound thereon a few turns of a cable 96, the lower end of which is anchored at 97 to the beam 57 (Figure 2). Each cable 96 is suitably anchored to its drum 95. Also disposed on each drum are a few turns of a cable 98. The end of cable 98 associated with its drum 95 is suitably anchored to the drum. The two cables 98 are disposed parallel to each other and extend rearwardly alongside of the horizontal leg 27 of combustion chamber 16.

Each cable 98 extends over a pulley 99 carried on a transverse shaft 100. This shaft 100 is rotatably carried in journals 101 which may be anchored to the end of plate 30 of combustion chamber 16. After passing over the pulley 99 the associated cable 98 extends downwardly, as shown in Figure 2, and has its lower end anchored at 102 to the top plate 47 of oven 40.

The operation of my novel burner construction is believed to be fairly evident on the foregoing detailed description. The oven 40 is initially lowered, by turning hand wheel 94, into proximity with the ground over which the burner is to pass. Obviously, the hand wheel 94 and the associated mechanism provides a means by which the oven 40 may be adjusted vertically with facility. After the oven 40 has been properly adjusted the chain 68 is coupled to the pulling force which may consist of a tractor. Also, the forward ends of 105 of the converging beams 80 are suitably coupled to the same tractor. This means, as previously pointed out, that the oven 40 will be moved forward independently of the force being exerted on the frame 10 to move it forward. The advantage of this construction is that the guide rollers 71 and 72 are not frictionally bound to their associated guide members 75 and 76. Also, the lower end of the vertical leg 28 of combustion chamber 16 does not bind against the tubular member 55.

Thereafter the burner 33 is coupled to the oil supply and to the air supply by opening the two hand valves 37 and 38. Any conventional means may be provided for igniting the burner. The compressor unit 19 may be set into operation by any well-known clutch mechanism. This will result in air being supplied to the burner 33 and to the blower 25. The burner 33 will generate a tremendous heat in the horizontal leg 27 of combustion chamber 16 and this heat will be blown into the oven 40 by means of the blower 25. It will be noted that the heated gases are blown into the oven towards its forward end where the weeds initially present themselves to the action of the burner. Obviously the heat in the forward end of the oven will be much more intense than that in the rear end of the oven. This is desirable for the reason that there is more material to be consumed in the forward end of the oven than in the rear end. The hot gases entering the rear end of the oven 40 will function to burn any weeds or other vegetation remaining on the ground after these have been subjected to the intense heat at the forward end of the oven.

Should the oven strike any slight bumps or raised portions in the ground these raised portions are permitted to enter the oven without the necessity of raising the oven clear of them. This is permitted due to the pivotally mounted forward closure member 58. By making it of a sectionalized construction it is possible to minimize the heat losses each time a bump or projection enters the oven. In order to permit these bumps leaving the oven without the necessity of raising the oven I also provide the oven with a pivotally mounted rear end which is also made of a sectionalized construction in order to minimize heat losses. If the burner oven 40 comes into contact with a larger obstruction of too great a size to enter the forward end of the oven 40 then it will be necessary to raise the oven 40 in order to permit the obstruction passing under the oven 40. Once the obstruction is within the dimensions of the oven the oven may be lowered by turning the hand wheel 94.

Now I desire it understood that although I have illustrated and described in detail the preferred form of my invention, the invention is not to be thus limited, but only in so far as defined by the scope and spirit of the appended claims.

I claim as my invention:

1. In a machine of the character described, a combustion chamber comprising a right angular tube having the end of its horizontal leg provided with a closure, a vehicle frame for supporting said combustion chamber, a burner extending into the horizontal leg of the combustion chamber through the closure, said vertical leg of the chamber extending downwardly at the front end of the machine, and an oven extending substantially the length of the machine and having a collar at its forward end surrounding the vertical leg of said chamber and vertically movable with respect to the same.

2. In a machine of the character described, a combustion chamber comprising a tube, a burner extending into said chamber, a vehicle frame for supporting said combustion chamber, an oven disposed under said frame and in proximity to the ground, the lower end of said combustion tube discharging into said oven, and means carried by the vehicle frame for enabling the oven to be adjusted vertically and means on the frame and oven for guiding of said oven in its vertical movement.

3. In a machine of the character described, a combustion chamber comprising a tube, a burner extending into said chamber, a vehicle frame for supporting said combustion chamber, an oven disposed under said frame and in proximity to the ground and extending substantially the full length of the frame, the lower end of said combustion tube discharging into said oven, and means carried by the frame for enabling the oven to be adjusted vertically, said adjusting means comprising a plurality of wheels carried by the frame, cables connected to each end of said oven and extending from said oven to said wheels, and a single element manually operable to actuate said wheels so as to move the oven vertically.

4. In a machine of the character described, a combustion chamber comprising a tube, a burner extending into said tube, a vehicle frame for supporting the combustion tube, and an oven disposed below the frame between the wheels of the vehicle and substantially coextensive with the length of the vehicle and in proximity to the ground, the lower end of said tube being disposed in telescopic communication with said oven, said oven having an end thereof provided with a pivotally mounted closure whereby obstructions comprising bumps on the ground and the like may enter the oven without the necessity of raising the oven.

5. In a machine of the character described, a combustion chamber comprising a tube, a burner extending into said tube, a vehicle frame for supporting the combustion tube, and an oven disposed below the frame and in proximity to the ground, said oven being between the vehicle wheels and substantially coextensive with the tube, the lower end of said tube being disposed in telescopic communication with said oven, said oven having an end thereof provided with a pivotally mounted closure whereby obstructions comprising bumps on the ground and the like may enter the oven without the necessity of raising the oven, said closure including a plurality of pivotally mounted sections movable independently of each other.

6. In a machine of the character described, a combustion chamber, a vehicle frame for supporting the same, an oven disposed between the vehicle wheels and below the frame in proximity to the ground and in telescopic communication with said combustion chamber, said oven being substantially coextensive with the vehicle frame, means carried by said frame for adjusting said oven vertically, and guiding means on the frame and oven for guiding the oven in its vertical movement.

7. In a machine of the character described, a combustion chamber, a frame for supporting the same, an oven disposed below the frame in proximity to the ground and in communication with said combustion chamber, means carried by said frame for adjusting said oven vertically and guiding means between the frame and oven for guiding the oven in its vertical movement, said guiding means comprising rollers carried by the oven and cooperating guideways carried by the frame.

8. In a machine of the character described, a combustion chamber, a frame for supporting the same, an oven disposed below the frame in proximity to the ground and in communication with said combustion chamber, means carried by said frame for adjusting said oven vertically, and guiding means between the frame and oven for guiding the oven in its vertical movement, said adjusting means comprising drums carried by the frame, cables connecting said drums to said oven, and a manually operable member for actuating said drums.

9. In a machine of the character described, a combustion chamber, a vehicle frame for supporting the same, an oven disposed between the vehicle wheels and below the frame comprising a box-like structure having its open side in proximity to the ground, said oven being in telescopic communication with said combustion chamber so as to permit the heat in said chamber being discharged into the oven and onto the surface growth, means for moving said oven vertically, guides on said frame and said oven, and means for moving said frame and oven over the ground, said means including independent connections to said frame and oven whereby forward movement is imparted to the oven independently of the movement being transmitted to the frame, said guides being effective to prevent binding between said oven and said chamber during forward movement of the machine and vertical movement of said oven.

10. In a machine of the character described, a combustion chamber, a frame for supporting the same, an oven disposed below the frame having an open side in proximity to the ground, said oven being in communication with said combustion chamber so as to permit the heat in said chamber being discharged into the oven and onto the surface growth, means for moving said frame and oven over the ground, said means including independent connections to said frame and oven whereby forward movement is imparted to the oven independently of the movement being transmitted to the frame, and means carried by the frame for adjusting and guiding the oven vertically without interfering with the forward movement of the machine.

11. In a machine of the character described, a combustion chamber, a frame for supporting the same, an oven disposed below the frame having an open side in proximity to the ground, said oven being in communication with said combustion chamber so as to permit the heat in said chamber being discharged into the oven and onto the surface growth, means for moving said frame and oven over the ground, said means including independent connections to said frame and oven whereby forward movement is imparted to the oven independently of the movement being transmitted to the frame to prevent binding between said oven and said chamber, means carried by the frame for adjusting the oven vertically without interfering with the forward movement of the machine, and guiding means carried by the frame for guiding the oven in its vertical movement, said combustion chamber comprising a right angular tube having its vertical leg extending downwardly into said oven.

In testimony whereof I have hereunto subscribed my name at Chicago, Cook County, Illinois.

EUGENE C. GRAVES.